US007905976B2

(12) United States Patent
Ogawa

(10) Patent No.: US 7,905,976 B2
(45) Date of Patent: Mar. 15, 2011

(54) LABEL PEELING METHOD FOR LABEL PAPER SHEET AND LABEL PRINTER

(75) Inventor: Takeshi Ogawa, Shizuoka (JP)

(73) Assignee: Star Micronics Co., Ltd., Shizuoka (JP)

( * ) Notice: Subject to any disclaimer, the term of this patent is extended or adjusted under 35 U.S.C. 154(b) by 719 days.

(21) Appl. No.: 11/577,879

(22) PCT Filed: Oct. 20, 2005

(86) PCT No.: PCT/JP2005/019270
§ 371 (c)(1),
(2), (4) Date: Apr. 25, 2007

(87) PCT Pub. No.: WO2006/046546
PCT Pub. Date: May 4, 2006

(65) Prior Publication Data
US 2009/0120578 A1 May 14, 2009

(30) Foreign Application Priority Data
Oct. 26, 2004 (JP) ................................ 2004-310985

(51) Int. Cl.
*B29C 65/48* (2006.01)
*B29C 63/04* (2006.01)
*B32B 37/26* (2006.01)
*B32B 38/14* (2006.01)

(52) U.S. Cl. ........ 156/247; 156/249; 156/277; 156/289; 156/344

(58) Field of Classification Search .................. 156/547, 156/249, 277, 289, 344, 350, 351, 357, 361–363, 156/384, 387, 537–542, 584; 400/55–59, 88, 578, 611, 612, 902
See application file for complete search history.

(56) References Cited

U.S. PATENT DOCUMENTS 5,980,138 A * 11/1999 Shiozaki et al. .............. 400/582
(Continued)

FOREIGN PATENT DOCUMENTS

JP 58-20631 A 2/1983
(Continued)

OTHER PUBLICATIONS

International Search Report (PCT/JP2005/019270) dated Jan. 17, 2006.

(Continued)

*Primary Examiner* — Philip C Tucker
*Assistant Examiner* — Sing P Chan
(74) *Attorney, Agent, or Firm* — Pearne & Gordon LLP

(57) ABSTRACT

A label peeling method for label sheet includes: conveying a label sheet including a base sheet and a label affixed to the base sheet along a conveying path that is bent at a bent portion; and performing a printing operation on the label from a beginning portion of printing while conveying the label sheet, wherein the conveying of the label sheet and the printing operation are stopped once in a state where the label sheet is conveyed until a conveying-direction leading end portion of the label reaches a downstream side of the bent portion of the conveying path, after a stopping state is held for a predetermined time, the conveying of the label sheet and the printing operation are resumed so that the label is peeled from the base sheet at the bent portion of the conveying path.

2 Claims, 8 Drawing Sheets

U.S. PATENT DOCUMENTS 7,040,822 B2 * 5/2006 Fries et al. ...................... 400/88

FOREIGN PATENT DOCUMENTS

| | | |
|---|---|---|
| JP | 2129010 | 10/1990 |
| JP | 6-210911 | 8/1994 |
| JP | 09-164742 A | 6/1997 |
| JP | 9-315417 | 12/1997 |
| JP | 2002-326616 A | 11/2002 |
| JP | 2004-115041 | 4/2004 |

OTHER PUBLICATIONS

Japanese Office action dated May 26, 2010.

* cited by examiner

LABEL PEELING METHOD FOR LABEL PAPER SHEET AND LABEL PRINTER

TECHNICAL FIELD

The present invention relates to a method wherein, while conveying a label sheet including a base sheet and a label affixed thereto, a printing operation is performed on the label and, after then, the label is peeled from the base sheet, and a label printer suitable for realizing the label peeling method.

BACKGROUND ART

Necessary information is printed on the label of the above-mentioned label sheet, the label is peeled off from the base sheet and the thus peeled label is then affixed to goods. There is provided a label printer wherein the operation to print the necessary information on the label and the operation to peel off the label from the base sheet are carried out successively.

Generally, there is known a label printer of such a type which pulls out a label sheet wound in a roll shape, prints necessary information on a label mounted on the label sheet while conveying the label sheet, and, after printed, bends the conveying path of the label sheet at an acute angle, whereby the label is allowed to move straight due to its own rigidity and peel off from the base sheet.

In such label printer, since the adhesive power of the label with respect to the base sheet is strong, or since the end edge of the label bites into the base sheet when the label is formed by punching only an adhesive sheet mounted on the base sheet, the label is difficult to peel off from the base sheet. And, when the label does not peel off from the base sheet smoothly, not only the printed label is not discharged properly but also a trouble occurs in conveying the label sheet to thereby cause the label printer to stop.

Thus, as a printer which is capable of preventing the above-mentioned problems, there is provided a printer wherein, before the whole of the label is peeled off from the base sheet, holds and lifts at least one side of the label to thereby peel a part of the label once and, after then, peels the label wholly from the base sheet (Patent Document 1).

Patent Document: JP-UM-A-2-129010

DISCLOSURE OF THE INVENTION

Problems that the Invention is to Solve

In the peeling apparatus disclosed in the above-cited document, since it is necessary to provide a peel aid device that peels the label preliminarily, increases the number of parts and thus increases the size of the apparatus is necessary. Thus, there has been demanded the development of a technology which is capable of peeling the label in a simple configuration without incurring the increased number of parts and the increased size of the apparatus.

In view of the above, it is one object of the invention to provide a label peeling method for label sheet which is capable of peeling a label securely in a simple configuration without providing a separate device for peeling the label, and a label printer on which the method is specifically reflected.

Means for Solving the Problems

According to an embodiment of the invention, the label peeling method for label sheet includes: conveying a label sheet including a base sheet and a label affixed to the base sheet along a conveying path that is bent at a bent portion; and performing a printing operation on the label from a beginning portion of printing while conveying the label sheet, wherein the conveying of the label sheet and the printing operation are stopped once in a stopping state where the label sheet is conveyed until a conveying-direction leading end portion of the label reaches a downstream side of the bent portion of the conveying path, after a stopping state is held for a predetermined time, the conveying of the label sheet and the printing operation are resumed so that the label is peeled from the base sheet at the bent portion of the conveying path.

According to the above label peeling method, when only the conveying-direction leading end portion of the label is fed more downstream than the bent portion of the conveying path, normally, the leading end portion is allowed to peel from the base sheet due to its own rigidity without being bent. That is, the label is preliminarily peeled in this manner. Therefore, even in a state where the label is difficult to peel from the base sheet due to the strong adhesion thereof, the preliminarily peeling state, that is, the state, in which the conveying-direction leading end portion of the label is fed more downstream than the bent portion of the conveying path, is held continuously for a predetermined time, which makes it possible to cause a phenomenon that the leading end portion of the label peels gradually from the base sheet. In this manner, after the label is peeled preliminarily, the conveying of the label sheet is resumed, and a printing operation is performed while conveying the label sheet. This makes it possible to peel the preliminarily peeled label securely from the base sheet.

Also, according to an embodiment of the invention, a label peeling method for label sheet includes: conveying a label sheet including a base sheet and a label affixed to the base sheet along a conveying path that is bent at a bent portion; and performing a printing operation on the label while conveying the label sheet, wherein the label sheet is conveyed until a conveying-direction leading end portion of the label reaches a downstream side of the bent portion of the conveying path, an operation to reversely convey the label sheet to a beginning portion of printing at an upstream side in a conveying direction is performed at least once, and thereafter, the printing operation on the label is performed while the label sheet is conveyed so that the label is peeled from the label sheet.

According to the present label peeling method, after the label sheet is conveyed until only the conveying-direction leading end portion of the label reaches the downsstream side of the bent portion of the conveying path, an operation to reversely convey the label sheet to a beginning portion of printing at the upstream side in the conveying direction thereof is carried out at least once, preferably, the operation may be carried out several times; and, after then, the printing operation on the label is performed while the label sheet is conveyed so that the label is peeled from the label sheet. Thanks to a series of operations in which the leading end portion of the label is fed from the bent portion to the downstream side thereof, the label sheet is then conveyed reversely, and the regular label sheet conveying is next started, the preliminary peeling for peeling the leading end portion of the label from the base sheet can be attained securely and, therefore, in the regular label peeling operation to be performed later, the label is allowed to securely peel from the base sheet.

Next, according to an embodiment of the invention a label printer includes: a conveying path along which a label sheet in conveyed, the label sheet including a base sheet and a label affixed to the base sheet, the conveying path being bent at a bent portion; a print mechanism that is disposed in an intermediate portion of the conveying path and performs a printing operation on the label from a beginning portion of printing; a peel mechanism disposed on a downstream side of the conveying path with respect to the print mechanism and peels the label from the base sheet at the bent portion of the conveying path; a label sheet conveying mechanism that conveys the label sheet along the conveying path; and a control unit that controls the label sheet conveying mechanism and the print mechanism such that the label sheet is conveyed until a conveying-direction leading end portion of the label reaches a downstream side of the peel mechanism, the conveying of the label sheet is stopped once at this state, and thereafter, the conveying of the label sheet while performing the printing operation is resumed.

According to an embodiment of the invention, a label printer includes: a conveying path along which a label sheet is conveyed, the label sheet including a base sheet and a label affixed to the base sheet, the conveying path being bent at a bent portion; a print mechanism that is disposed in an intermediate portion of the conveying path for performing a printing operation on the label; a peel mechanism that is disposed on a downstream side of the conveying path with respect to the print mechanism and peels the label from the base sheet at the bent portion of the conveying path; a label sheet conveying mechanism that conveys the label sheet along conveying path; and a control unit that controls the label sheet conveying mechanism and the print mechanism such that the label sheet is conveyed until a conveying-direction leading end portion of the label reaches a downstream side of the peel mechanism, an operation to reversely convey the label sheet to a beginning portion of printing at an upstream side in a conveying direction is performed at least once, and thereafter, the label sheet is conveyed while performing the printing operation.

Effects of the Invention

According to the invention, by bending the conveying path of the label sheet, prior to execution of a regular label peeling operation to peel the label, only the conveying-direction leading end portion of the label is conveyed to the downstream side of the bent portion of the conveying path, and this state is held for a predetermined time, or the label sheet is conveyed reversely from this state and is then conveyed again, thereby peeling the leading end portion of the label preliminarily. Whereby, in the regular label peeling operation to be performed later, the label can be peeled from the base sheet surely. Since a device for preliminarily peeling the label is not provided separately but the preliminary label peeling is attained through the conveying operation of the label sheet, the label can be peeled without increasing the number of parts and the size of the label printer.

BEST MODE FOR CARRYING OUT THE INVENTION

Now, description will be given below of an embodiment of a label printer according to the invention with reference to the accompanying drawings.

FIG. 1 shows a label printer 1 according to an embodiment of the invention, FIG. 2 is an enlarged view of the part II shown in FIG. 1, and FIG. 3 shows the procedure for setting a label sheet 10 in the label printer 1 in the order of FIG. 3(*a*) to 3(*d*).

As shown in FIGS. 1 and 3, the label printer 1 includes a rectangular-shaped casing 20 for storing the label sheet 10. The casing 20 includes two covers 30 and 40 (upper cover and lower cover) for closing the upper opening of the casing 20 through a hinge shaft 21 extending in the right and left direction (in FIGS. 1 and 3, in the front and rear direction) in such a manner that the two covers 30 and 40 are capable of opening and closing. These upper and lower covers 30 and 40 share the single hinge shaft 21 and are capable of rotating independently from each other so that two covers 30 and 40 are opened and the label sheet 10 can be stored in a label sheet storage part 22 formed in the casing 20.

The label sheet 10 including a base sheet 11 and a large number of labels 12 affixed on one side of the base sheet 11. The label sheet 10 is stored in such a manner that it is wound in a roll state on a core member 13 while the labels 12 are arranged on the outer peripheral side thereof. The label sheet 10 is dropped down and stored in the label sheet storage part 22 in such a manner that the core member 13 is held substantially parallel to the hinge shaft 21 and also in such an attitude that the front end portion of the label sheet 10 can be pulled upward from below. The upper and lower covers 30 and 40 can be respectively engaged with the casing 20 by an engaging mechanism (not shown) and the fully closed state of the casing 20 shown in FIG. 1 is held when they are in an engaged state.

The label printer 1 includes a print mechanism 50 for performing a printing operation on the labels 12. This print mechanism 50 mainly includes a platen roller 51 mounted on the lower cover 40, and a print head 52 of a thermal type.

The lower cover 40, as shown in FIG. 1, includes a base end portion 41 extending forward horizontally from its mounting portion on the hinge shaft 21 in the closed state of the lower cover 40, an inclined portion 42 which is inclined from the base end portion 41 in such a manner that the front thereof lowers down forwardly, an R portion 43 which is curved from the inclined portion 42 over to the front end portion of the lower cover 40 in such a manner that the front thereof rises up forwardly, and right and left triangular-shaped side wall portions 44 respectively rising from the two end edges of a portion extending from the intermediate portion of the inclined portion 42 to the R portion 43; and, the rear end portion of the base end portion 41 is rotatably mounted on the hinge shaft 21 in such a manner that it is capable of rotating freely. On the front end portion of the lower cover 40, there is rotatably mounted the platen roller 51 while the axial direction of the platen roller 51 extends parallel to the hinge shaft 21.

The print head 52 is mounted on the upper portion of the inner surface of the front wall portion 20*a* of the casing 20 and is urged backward (in FIG. 1, to the right direction) by a spring (not shown). When the lower cover 40 is closed, the platen roller 51 is allowed to face the print head 52, while the print head 52 is elastically pressed against the platen roller 51. The label sheet 10, which has been pulled out from the roll state thereof, is held by and between the platen roller 51 and print head 52 and, as the platen roller 51 is rotated clockwise in FIG. 1, the label sheet 10 is conveyed upward. The platen roller 51 is rotated by a conveying motor 53 (which will be discussed later) mounted on the casing 20 and a drive mechanism (not shown) including reduction gear groups and, when the lower cover 40 is closed, the platen roller 51 can be connected to the drive mechanism. This drive mechanism and platen roller 51 cooperate together in configuring a label sheet conveying mechanism.

Between the front ends upper portions of the right and left side walls 44 of the lower cover 40, there is mounted a fine bar-shaped peel bar 60 which extends parallel to the platen roller 51. This peel bar 60 is used to divide the label sheet 10 into the base sheet 11 and labels 12 and, when the lower cover 40 is closed the peel bar 60 is disposed at a position which exists just above the print mechanism 50 and where the label sheet 10 has just passed through the print mechanism 50. The label sheet 10 is conveyed from below in such a manner that it passes through the print mechanism 50; and, the conveying path of the label sheet 10 existing on the downstream side of the print mechanism 50 extends along the peripheral surface of the front side of the peel bar 60 and then extends backward, whereby the conveying path is bent at an acute angle in the portion thereof where it passes through the peel bar 60.

The upper cover 30 includes right and left side wall portions 31 respectively disposed on the two sides of the lower cover 40, and a ceiling plate portion 32 provided across these side walls 31, while the rear end portions of the respective side walls 31 are rotatably mounted on the hinge shaft 21. The ceiling plate portion 32 extends forward from positions which are spaced a predetermined distance from the rear end portions of the right and left side walls 31, while a space formed on the rear side of the ceiling plate portion 32 provides a base sheet discharge opening 33. In the front side of the side wall portion 31, which is the front end portion of the ceiling plate portion 32, there is formed a label discharge opening 34. On and from the rear side of the label discharge opening 34, there is provided a lower guide 35 which inclines down forward. As shown in FIGS. 3(*c*) and 3(*d*), when the upper and lower covers 30 and 40 are closed, the base sheet discharge opening 33 of the upper cover 30 is covered with the base end portion 41 of the lower cover 40 with the front side portion thereof left uncovered, while the uncovered front side portion serves as the substantial base sheet discharge opening 33.

As shown in FIG. 2, in the portion of the ceiling plate portion 32 that exists in front of the label discharge opening 34, there is provided a front plate portion 36. On the lower surface of the front portion of the front plate portion 36, there is provided a projecting strip 37 which extends right and left in such a manner that it projects more downward as it goes more forward. Also, on the rear portion of the front plate portion 36, there is provided an upper guide 38 which inclines in such a manner that the front thereof rises up backward. The upper guide 38 extends parallel to the lower guide 35 with a space between them.

The conveying direction of the label sheet 10 from the print mechanism 50 to the peel bar 60 extends along the direction of a tangent drawn from a contact point between the platen roller 51 and print head 52 to the outer peripheral surface of the front side of the peel bar 60, that is, it extends substantially upward in the vertical direction. The upper guide 38 is disposed on the front side (print surface side) of the label 12 to be discharged to the label discharge opening 34 and is also projected backwardly of the conveying direction of the label sheet 10 extending substantially upward in the vertical direction just before the peel bar 60, that is, it is projected toward the affixed surface side of the label 12 to the base sheet 11. A space formed between the upper and lower guides 38 and 35 define a label discharge passage 70 which rises obliquely backward.

As shown in FIG. 2, on the upper surface of the front wall portion 20*a* of the casing 20, namely, on the edge portion of the opening side of the casing 20, there is formed a cutter portion 23 which rises up obliquely backward and has a triangular-shaped section, and the leading end portion of which is formed in an acute angle. The cutter portion 23 extends right and left and also has a width capable of cutting the label sheet 10. When the upper cover 30 is closed, the rear end edge of the flat lower surface of the front plate portion 36 is situated just above the leading end of the cutter portion 23, or is contacted with the leading end of the cutter 23. Also, when the upper cover 30 is closed, the lower end of the projecting strip 37 of the front plate portion 36 is situated below the leading end of the cutter 23 and thus, between the front plate portion 36 and cutter portion 23, there is formed a clearance the front of which lowers down. A space existing upward of the front wall portion 20*a*, which extends from the leading end of the cutter portion 23 through the forward lowered upper surface of the cutter portion 23 to the front end of the front wall portion 20*a*, provides a label sheet set passage 72.

Also, downward of the lower guide 35, there is disposed a peel roller 61 which extends parallel to the platen roller 51. This peel roller 61 is rotatably supported between projecting portions 31*a* which are respectively provided on the front end portions of the right and left side wall portion 31. When the upper and lower covers 30 and 40 are closed, the peel roller 61 is closely contacted with the platen roller 51 and is rotated by the platen roller 51 in such a manner that it follows the rotation of the platen roller 51. The base sheet 11, from which the label 12 has been peeled, is held by and between the platen roller 51 and peel roller 62 and, as the platen roller 51 rotates, the base sheet 11 is conveyed along a base sheet discharge passage 71 which extends from between the two rollers 51 and 61 through the upper surface of the lower cover 40 to the base sheet discharge opening 33.

Also, at the position of the lower surface of the upper cover 40 that can be contacted with the rear end portion of the lower guide 35, there is mounted a peel sensor 62 which detects a label 12 existing in the label discharge opening 34. This peel sensor 62 is a sensor of a light reflection type which detects the existence of the label 12 in the label discharge opening 34; and, specifically, the peel sensor 62 detects that the label 12 has been correctly peeled from the base sheet 11 and also that the label 12 has been taken out by a user.

Further, on the portion of the inner surface of the front wall portion 20*a* of the casing 20 that exists downward of the print head 52, there is mounted a label sensor 63. This is a sensor of a light reflection type which detects, while the label sheet 10 is being conveyed, the conveying-direction leading end edge of the label 12 affixed to the base sheet 11 has reached the position of the label sensor 63.

Now, FIG. 4 shows the configuration of a control system which is incorporated into the label printer 1, while the control of the conveying of the label sheet 10 and the printing onto the labels 12 is performed by a CPU 100. To this CPU 100, there are connected a ROM 101 for storing a control program and the like; a RAM 102 for storing print data received from an externally provided host computer, operation information about the operation of the label printer 1 when it is in operation and the like; and, an I/F (interface) 103 which is used to connect the label printer 1 to the host computer.

Further, to the CPU 100, there are also connected the print head 51, a conveying motor 53 for driving the platen roller 51, a sheet feed switch 24, the label sensor 63, and the peel sensor 62 respectively through an input/output port 104. The conveying motor 53 is stepping motor, which controls conveying quantity of the label sheet 10 corresponding to the number of stepping.

When the label sensor 63 detects the conveying direction leading end edge of the label 12, it outputs an on signal to the CPU 100; and, when the peel sensor 62 detects that the label 12 exists in the label discharge opening 34, outputs an on signal to the CPU 100. These sensors 62 and 63 are respectively monitored by a program for their on/off states. The sheet teed switch 24 is disposed in the proper portion of the casing 20 such as the upper surface of the front wall portion 20*a* and, when the sheet feed switch 24 is turned on, the conveying motor 53 is rotated forward and the platen roller 51 is rotated in a direction to convey the label sheet 10.

The configuration of the label printer 1 is as described above and, next, description will be given below of the method for using the label printer 1 and operations to be carried out by the above-mentioned control system.

(1) Setting of Label Sheet

Firstly, description will be given below of the procedure for setting the label sheet 10 with reference to FIG. 3.

As shown in FIG. 3(*a*), the upper and lower covers 30 and 40 are opened, the core member 13 is arranged substantially parallel to the hinge shaft 21, and the roll-shaped label sheet 10 is dropped down into the label sheet storage part 22 in an attitude where the end portion of the label sheet 10 disposed on the front side thereof is pulled upward from below. Next, the end portion of the label sheet 10 is pulled out to the outside of the casing 20 and, after then, as shown in FIG. 3(*b*), the lower cover 40 is closed. The pulled-out label sheet 10 is held by and between the platen roller 51 and print head 52.

Next, as shown in FIG. 3(*c*), the base sheet 11 of the label sheet 10 is pressed against the peel bar 60 and is thereby turned back in the backward direction, the base sheet 11 is pulled out further to the outside through the base sheet discharge opening 33 of the upper cover 30, and, as shown in FIG. 3(*d*), the upper cover 30 is closed. When the upper cover 30 is closed, the label sheet 10 is held by and between the platen roller 51 and peel roller 61.

(2) Operation of Label Printer

Now, Description Will be Given Below of the Operation to be carried out by the control system with reference to FIG. 5.

After the label sheet 10 is set in the above-mentioned manner, a user turns on the sheet feed switch 24 (Step S101). When the platen roller 51 is rotated forward in the conveying direction by the conveying motor 53 and the conveying-direction leading end of the label 12 is detected for the first time by the label sensor 63 (Step S102), the conveying motor 53 is rotated by a predetermined number of steps at and from the then time to convey the label sheet 10 by a length corresponding to [peel position+preliminary peel amount] (Step S103).

Here, the term "peel position" means the position where the rear end edge of the label 12 existing one label downstream of the label 12 (the label on which printing is to be enforced from now) the leading end edge of which is detected by the label sensor 63 is fed to the downstream side of the peel bar 60 and the rear end edge of the label 12 is peeled from the base sheet 11; that is, the position where the whole of the label 12 is peeled. Also, the term "preliminary peel amount" means a length by which the leading end portion of the label 12 to be printed is fed to the downstream side of the peel bar 60. While, in Step S103, the leading end portion of the label 12 to be printed is fed to the downstream side of the peel bar 60, the leading end portion of such label 12 peels from the base sheet 11, which is turned back by the peel bar 60 and is conveyed backward, due to its own rigidity, whereby there occurs a preliminary peel phenomenon in which only the leading end portion of such label 12 peels. A state in Step S103 is shown in FIG. 6(*a*). By the way, in FIG. 6, for simplification of the drawing, there are omitted the upper and lower guides 38 and 35.

Next, it is checked whether the CPU 100 has received a print instruction from the host computer or not (Step S104) and it is also checked whether a label 12 exists in the label discharge opening 34 or not (Step S105). When it is found that the CPU 100 has received the print instruction but the peel sensor 62 detects that the label 12 does not exist in the label discharge opening 34 (a state where the peel sensor 62 is on), the platen roller 51 is rotated reversely, so that, as shown in FIG. 6(*b*), there is performed an operation to find the beginning of the label 12 to be printed in which the leading end portion of the label 12 to be printed is made to correspond to the print head 52 (Step S106). At the then time, the leading end portion of the preliminarily peeled label 12 is fed reversely more upstream than the peel bar 60 and is affixed again to the base sheet 11 but, since it is peeled off once due to the preliminary peeling operation, the adhesive power of the leading end portion of the label 12 to the base sheet 11 has weakened.

Next, based on the print data supplied, while rotating the platen roller 51 forward to convey the label sheet 10, the label 12 is printed by the print head 51 (Step S107). FIG. 6(*c*) shows a state where the printing is being enforced. With execution of the operation to print the label 12 while conveying the label sheet 10, the base sheet 11 just after the label 12 is printed is turned back in an acute angle by the peel bar 60, whereby the label 12 is peeled from the base sheet 11, passes through the upper label discharge passage 70 and goes out to the outside from the label discharge opening 34. On the other hand, the base sheet 11 with the label 12 peeled therefrom is conveyed backward along the base sheet discharge passage 71 by the platen roller 51 and peel roller 61, and the base sheet 11 shortly goes out to the outside from the base sheet discharge opening 33.

Next, when it is found that the print data are terminated (Step S108), the label sheet 10 is conveyed by a length [peel position+preliminary peel amount] in which the number of steps required for the printing is added (Step S109). As a result of this, similarly to the state shown in FIG. 6(*a*), the rear end (lower end) of the label 12 passes through the peel bar 60, whereby the label 12 is peeled from the base sheet 11 completely and is then discharged from the label discharge opening 34. On the other hand, the leading end portion of the label 12 to be printed next is fed to the downstream side of the peel bar 60, and the above-mentioned preliminary peel state occurs in this label 12.

And, the processing goes back to the step S104, where, in a state in which the preliminary peel state is held, the processing waits until it receives a next print instruction. After then, when not only the next print instruction is received but also the user takes away the discharged label 12 and the peel sensor 62 detects that the label 12 does not exists in the label discharge opening 34, the next print is started.

The above-mentioned operations are carried out repeatedly, whereby the printing operation and peeling operation onto the labels 12 are carried out one after another. According to the present embodiment, when peeling the label 12 from the base sheet, firstly, prior to the printing operation to be performed onto the label 12, only the leading end portion of the label 12 is fed once to the downstream side of the peel bar 60 including the bent portion of the conveying path to thereby peel the leading end portion preliminarily at the then time; and, next, the label sheet 10 is conveyed reversely to the upstream side and the printing operation is enforced onto the label 12. Therefore, in the regular label peeling operation to be performed next while printing the label 12, the label 12 can be securely peeled from the base sheet 12.

And, without separately providing a device for peeling the label 12 preliminarily, the preliminary peel can be performed through the conveying operation of the label sheet 10, which can avoid the inconvenience that the number of parts increases and the label printer increases in size.

By the way, according to the above embodiment, the preliminarily peeling operation for conveying the label sheet forwardly and reversely is performed once. However, the number of times of execution of the preliminarily peeling operation is not limited to one but such operation may be performed several times. The more the number of times of execution of the operation is, the more securely the preliminary peel can be attained even in the case of a label which is strong in the adhesive power thereof.

Also, instead of the forward and reverse conveying of the label sheet 10, there can be employed a method in which, in a state where the leading end portion of the label 12 is fed to the downstream side of the peel bar 60, the conveying of the label sheet 10 is stopped once and, after such state is held for a predetermined time, the conveying of the label sheet 10 is resumed. In this case, a printing operation is started in the state shown in FIG. 6(*b*) where the beginning portion of the label 12 is found, as shown in FIG. 6(*a*), at the time when the leading end portion of the label 12 reaches the downstream side of the peel bar 60, the conveying of the label sheet 10 is stopped once and, after then, the printing operation is carried out while conveying the label sheet 10.

In this manner, when the label sheet 10 is not reciprocated but the conveying of the label sheet 10 is stopped once and such stopping state is continued for a predetermined time, even in the case of a label which is difficult to peel, there can be produced a phenomenon that the leading end portion of the label gradually peels off from the base sheet 11. Therefore, the preliminarily peeling operation of the label 12 and the regular peeling operation to be performed after then can be carried out securely.

Also, in the present label printer 1, when the roll diameter of the label sheet 10 is relatively large and thus the curl of the label 12 is weak, as shown in FIG. 1, the label 12 is discharged substantially along the direction where the label discharge passage 70 extends. And, when the consumption of the label sheet 10 increases and thus the roll diameter thereof reduces, the degree of the curl of the label 12 to be discharged increases. Accordingly, as shown in FIG. 7, the printed surface of the label 12 is contacted with the upper guide 38 and thus the rear side of the label 12 relatively receives a pressing force from the upper guide 38; and, therefore, while the curl diameter of the label 12 is being forcibly increased, the label 12 passes through the label discharge passage 70.

This can prevent the occurrence of the inconvenience that the label 12 can be curled excessively to thereby cause the back surface of the adhesive surface thereof to attach to the printed surface of the front surface thereof, or the label 12 can fall down to the outside from the label discharge opening 34, whereby the label 12 can be made difficult to handle or cannot be used. Also, since the upper guide 38 is simply contacted with the printed surface of the label 12 to restrict the discharge direction of the label 12, there is no fear that the printed surface of the label 12 can be damaged.

Further, because there is no possibility that the label 12 can be parted away from the peel sensor 62 too much due to the strong curl of the label 12, the discharged label 12 can be detected securely by the peel sensor 62. In this case, when the peel sensor 62 detects that the label 12 is not present in the label discharge opening 34, a printing operation is started onto the next label 12. This can give rise to the occurrence of the following malfunction. That is, when the label 12 parts away from the peel sensor 62 too much, although the label 12 is present in the label discharge opening 34, it is judged that the label 12 is not present, so that the next printing operation is started. However, according to the present embodiment, such malfunction can be prevented.

Now, in the above-mentioned label printer 1, the printed label 12 can also be discharged in a state where it is not peeled from the base sheet 11 but the label sheet 10 remains as it is. When using the label printer 1 in this manner, the label sheet 10 is set in the following manner.

As shown in FIG. 8(*a*), similarly to the above-mentioned case, the label sheet 10 is dropped down into the label sheet storage part 22 provided within the casing 20. Next, as shown in FIG. 8(*b*), the label sheet 10 is pulled out and the excess end portion of the label sheet 10 is disposed so as to cover the upper surface of the front wall portion 20*a* of the casing 20; and, after then, the upper and lower covers 30 and 40 are closed. The excess end portion of the label sheet 10 is held by and between the upper surface of the front wall portion 20*a* of the casing 20 and the front plate portion 36 of the upper cover 30 and is disposed in the sheet set passage 72. In this state, the excess end portion of the label sheet 10 is pulled out to the outside, and the label sheet 10 is held by and between the platen roller 51 and print head 52.

Next, as shown in FIG. 8(*c*), the excess end portion of the label sheet 10 coming out forward from between the front wall portion 20*a* of the casing 20 and the front plate portion 36 of the upper cover 30 is pulled forward. As a result of this, the label sheet 10 is cut by the leading end of the cutter portion 23, whereby the excess end portion of the label sheet is removed. The cut end portion of the label sheet 10 with its excess end portion cut away, as shown by a two-dot chained line in FIG. 2, exists in the label discharge passage 70. After then, a printing operation is performed onto the label 12, and the label sheet 10, as shown in FIG. 8(*d*), is conveyed along the label discharge passage 70 and is discharged into the label discharge opening 34. By the way, in this case, since the label 12 after printed is not peeled from the label sheet 10, there is no need to perform the above-mentioned operation for attaining the preliminary peel state of the label 12. And, there is employed a control method for continuously executing a printing operation on the labels 12 while conveying the label sheet 10.

When the label 12 is discharged while it is not peeled from the label sheet 10 in this manner, at the stage where the excess end portion of the label sheet 10 is disposed in the label sheet set passage 72 and the label sheet 10 is cut by the cutter portion 23, the conveying path of the label sheet 10 to be printed is automatically switched over to the label discharge passage 70, thereby providing a label sheet setting state. Therefore, the switching of the label sheet passage can be carried out easily and securely.

Also, since the label sheet 10 is not conveyed reversely for the purpose of the switching of the passage, there is no possibility that the label sheet 10 can be deformed; for example, no wrinkles or bends can occur in the label sheet 10. Especially, as in the present embodiment, in a case where there is used the label sheet 10 including the base sheet 11 and the labels 12 affixed to the base sheet 11, when the label sheet 10 is conveyed reversely for a long distance, there is a fear that, for example, the rear end portion of the label 12 can reach the print head 52 and the print head 52 can peel the label 12 from the base sheet 11, resulting in the bent label sheet 10. However, because the label sheet 10 is not conveyed reversely, there is no possibility that such inconvenience can occur.

Also, since the label discharge passage 70 extends in the direction where the label sheet 10 is curled with respect to the label sheet set passage 72 (the direction where the rear of the label sheet 10 is inclined upwardly), when the label sheet 10 is cut, the leading end portion of the label sheet 10 is curled so that, as shown by a two-dot chained line in FIG. 2, it points to the same direction as the label discharge passage 70. This makes it possible to securely guide the label sheet 10 from the label discharge passage 70 to the label discharge opening 34.

Further, in the above-mentioned cutting operation, the cutter portion 23 projects upward and, on the other hand, the lower end of the projecting strip 37 of the upper cover 30 is situated downwardly of the leading end of the cutter portion 23 so that the excess end portion of the label sheet 10 is pressed downward, whereby the contact portion of the label sheet 10 with the leading end of the cutter portion 23 is bent at an acute angle. Thanks to this, when the excess end portion of the label sheet 10 is pulled forward, a stress, which the label sheet 10 receives from the leading end of the cutter portion 23, concentrates on the contact portion of the label sheet 10, thereby being able to cut the label sheet 10 easily.

Figure 1:
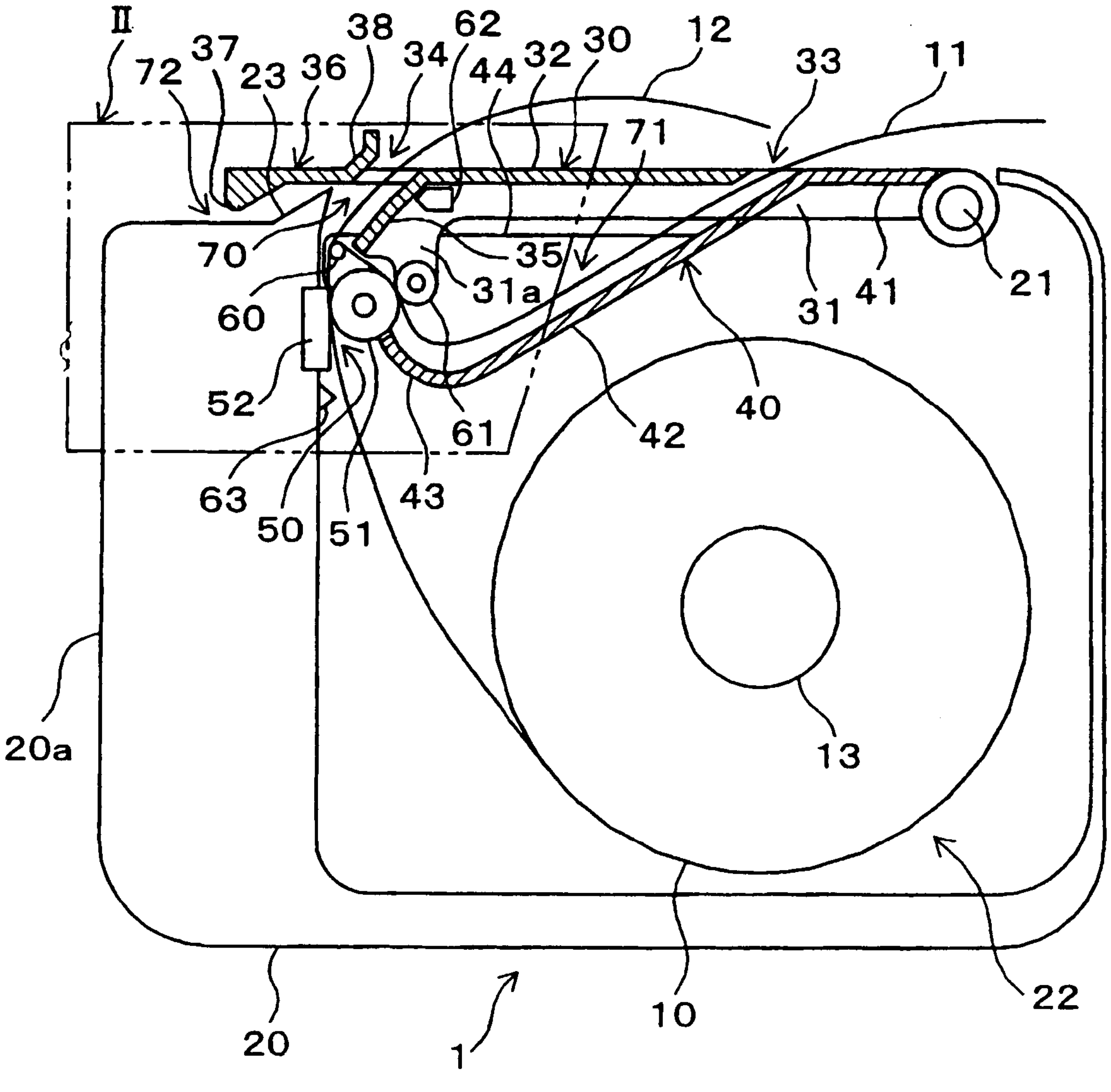
FIG. 1 It is a section view of a label printer according to an embodiment of the invention.
Figure 2:
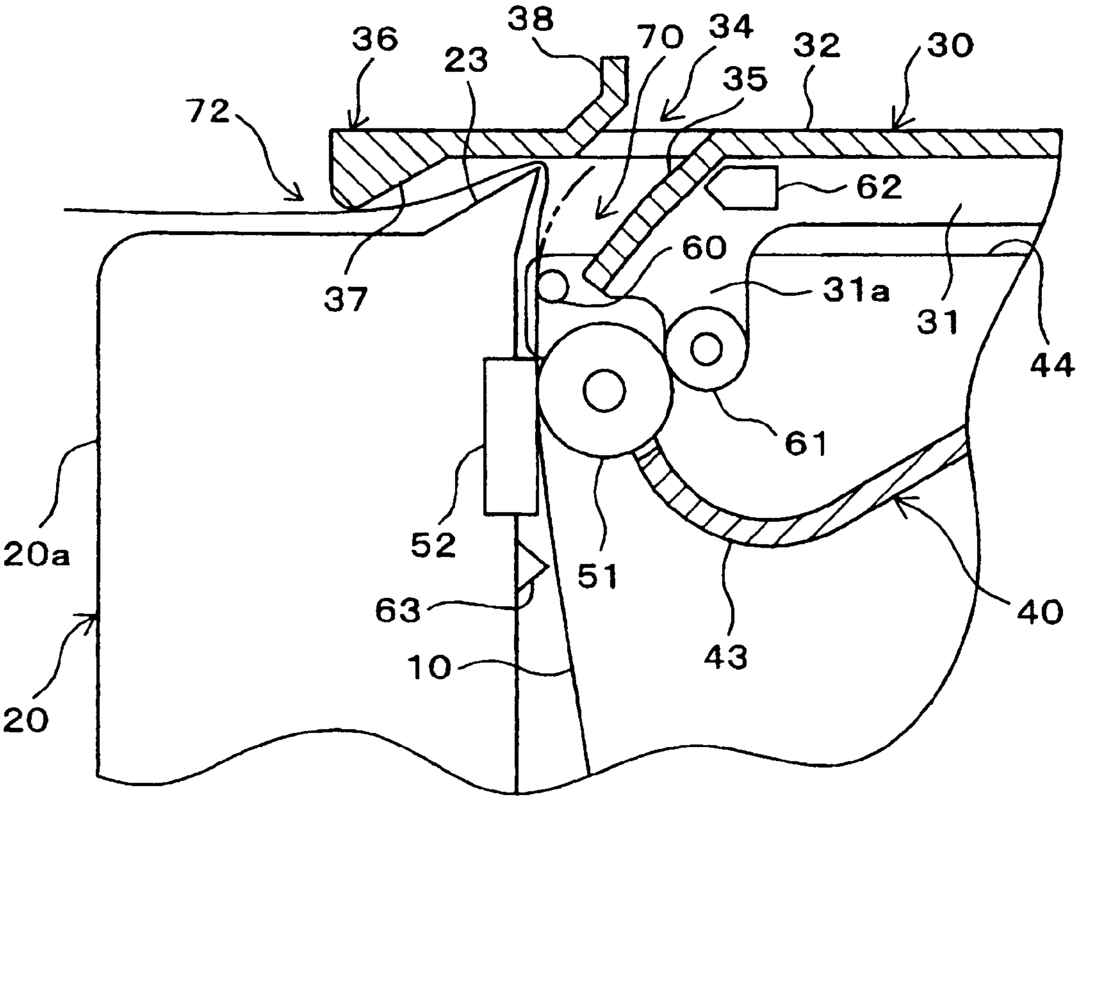
FIG. 2 It is a partially enlarged view of the II portion shown in FIG. 1.
Figure 3:
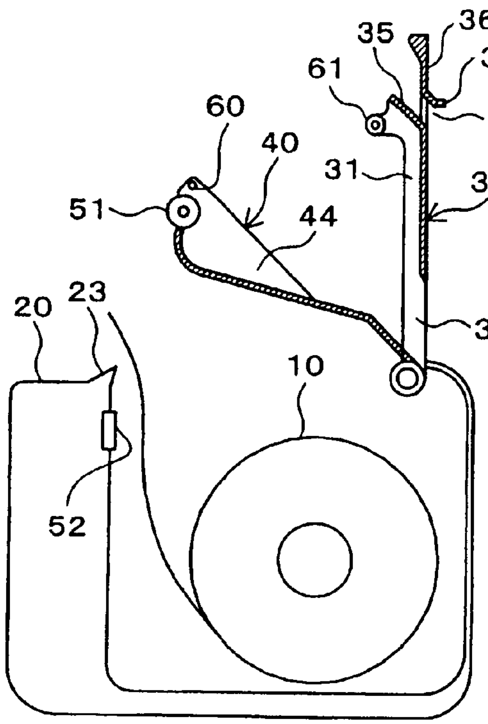
FIG. 3 It is a section view of a label printer according to the embodiment of the invention, showing the procedure for setting a label sheet in the label printer in the order of FIGS. 3(*a*) to 3(*d*).
Figure 3:
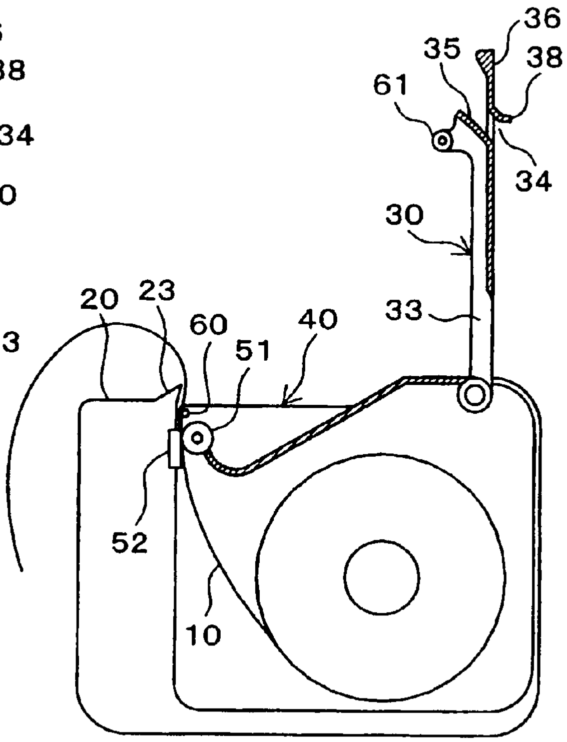
Figure 3:
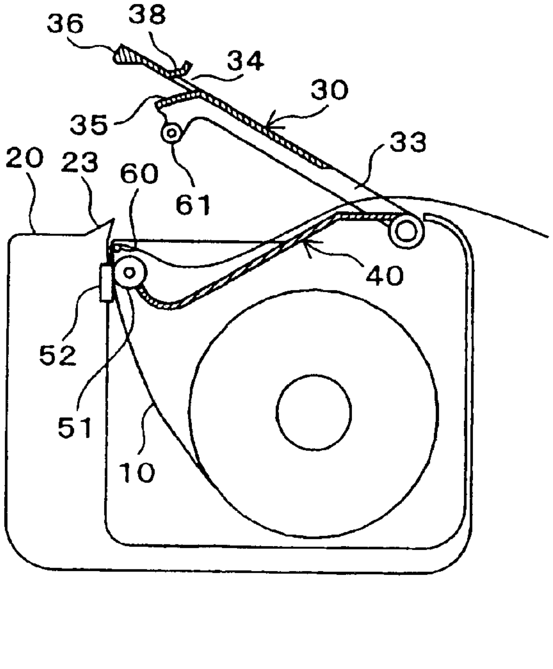
Figure 3:
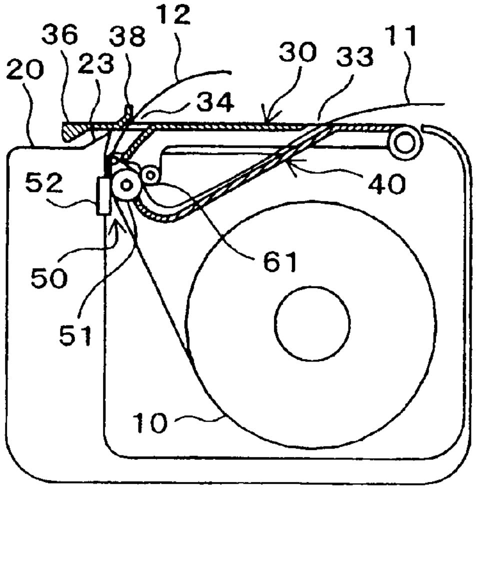
Figure 4:
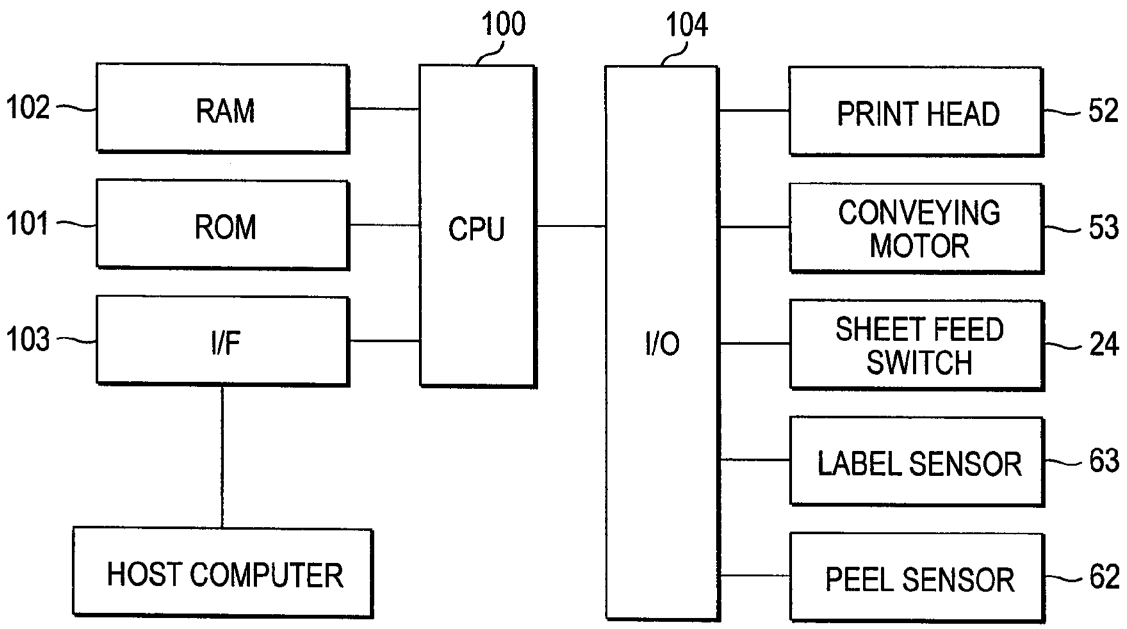
FIG. 4 It is a block diagram of the configuration of a control system employed in a label printer according to the embodiment of the invention.
Figure 5:
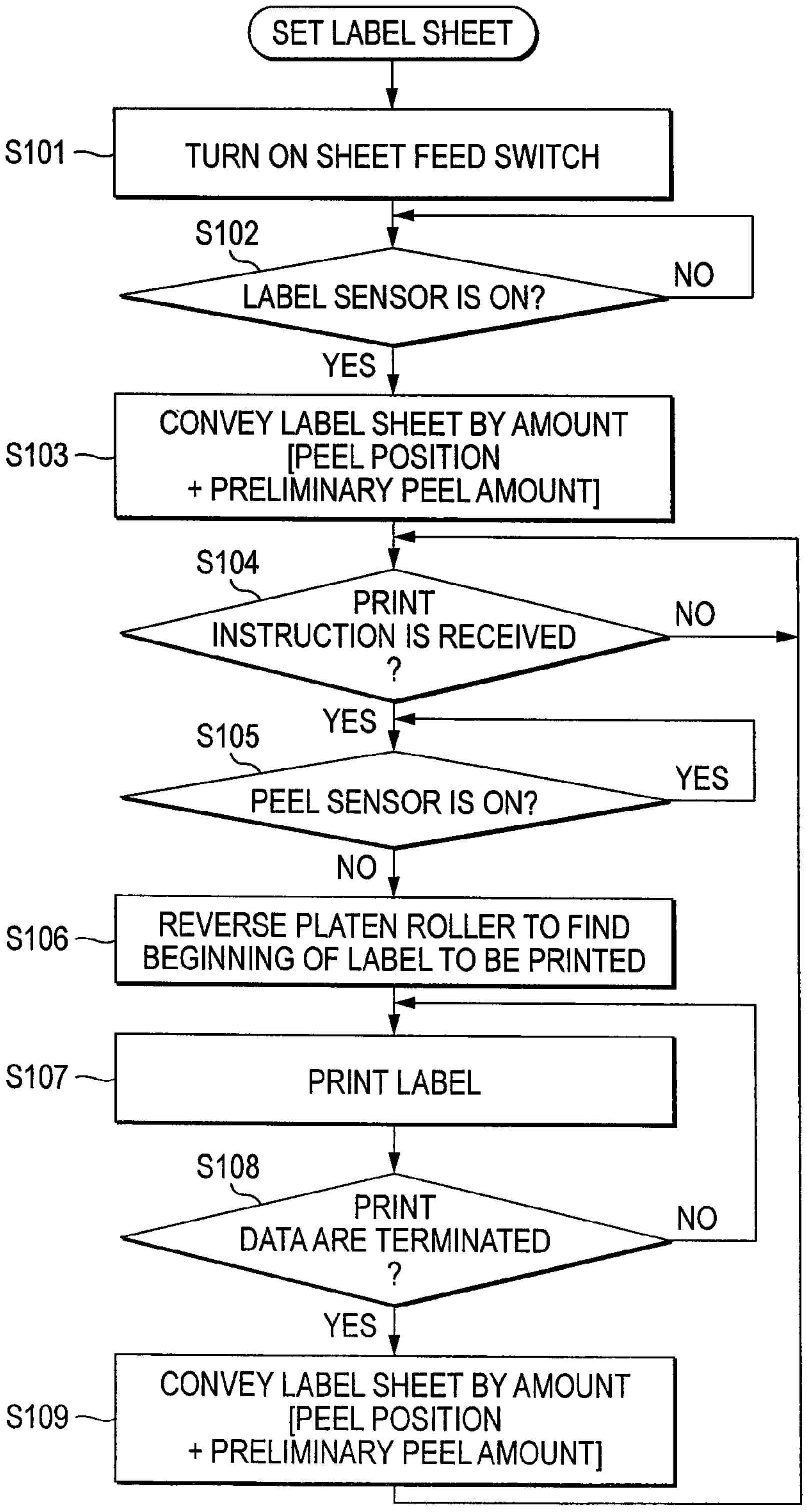
FIG. 5 It is a flow chart of the printing operation of a label printer according to the embodiment of the invention.
Figure 6:
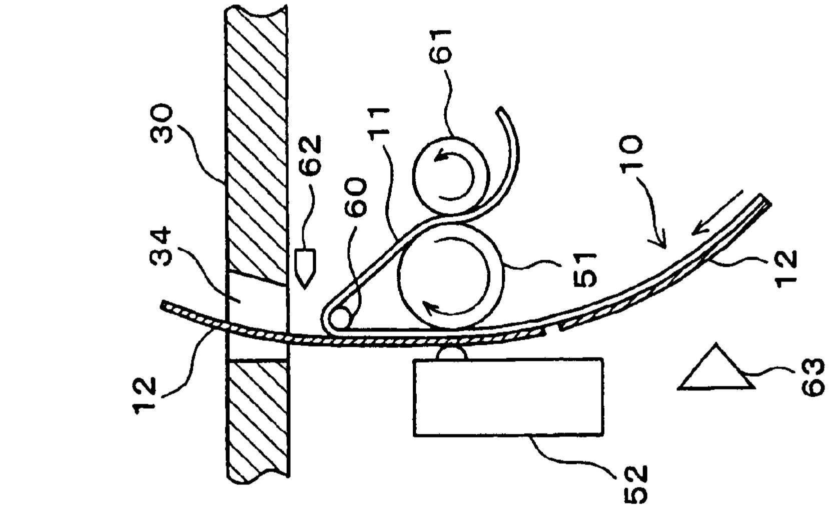
FIG. 6 It is a section view of a label printer according to the embodiment of the invention, showing the operation thereof for peeling a label preliminarily in the order of FIGS. 6(*a*) to 6(*c*).
Figure 6:
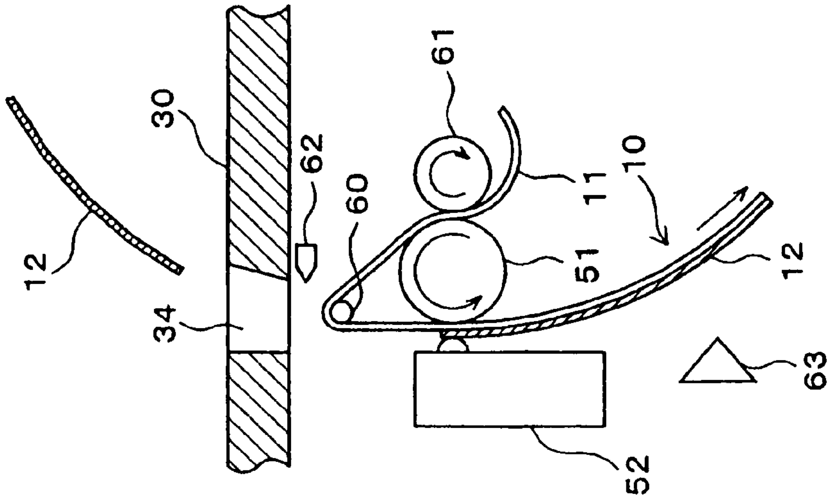
Figure 6:
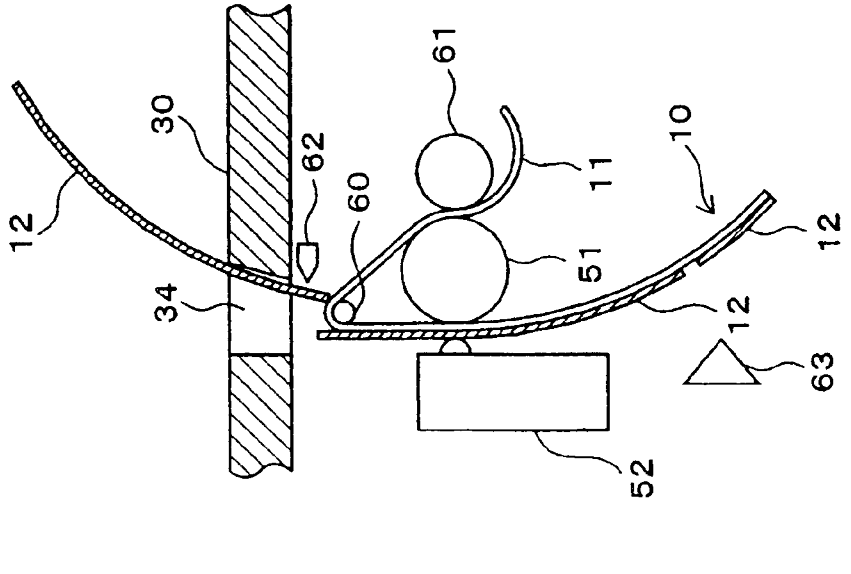
Figure 7:
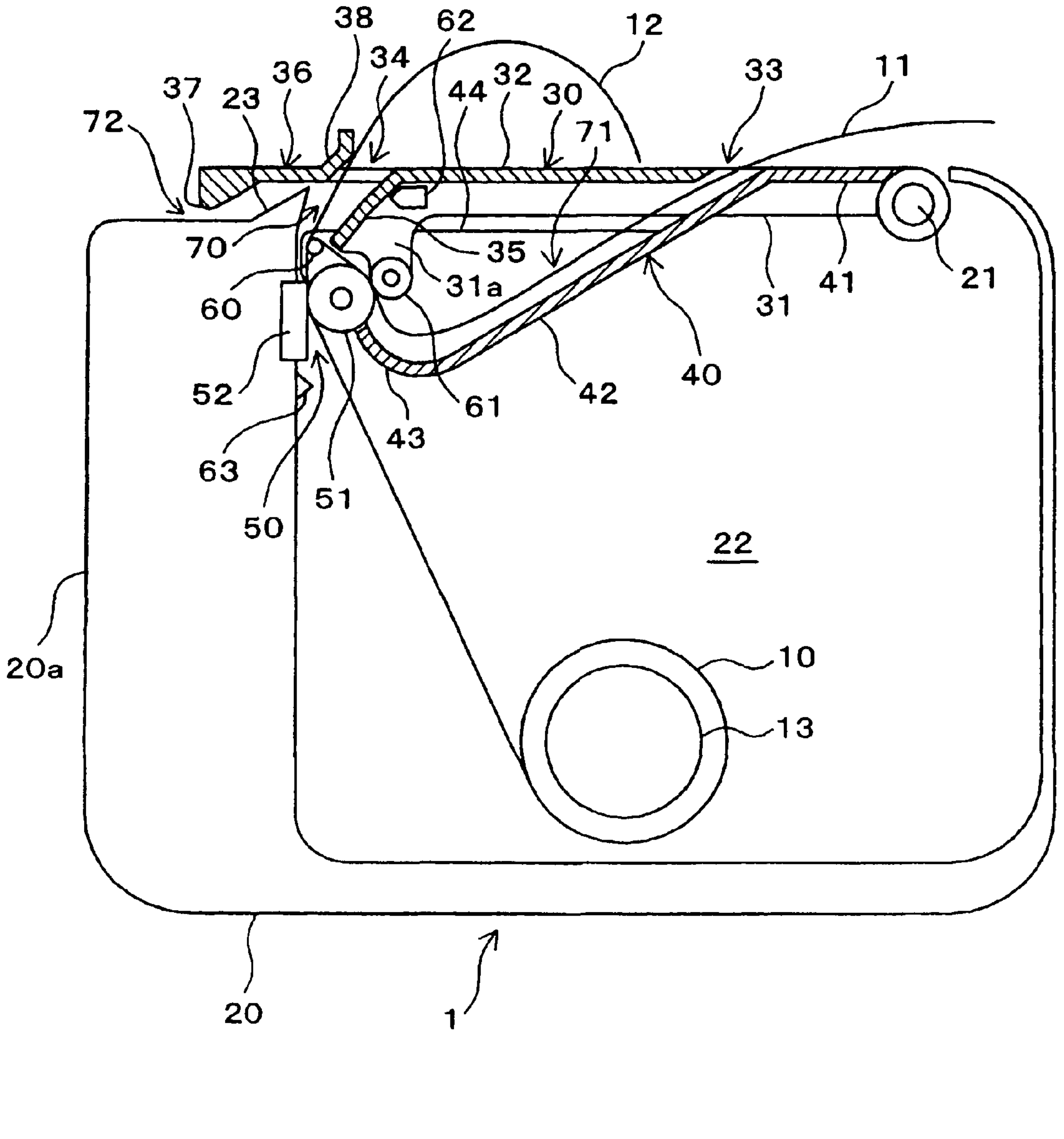
FIG. 7 It is a section view of a label printer according to the embodiment of the invention, showing a case where the roll diameter of a label sheet is small.
Figure 8:
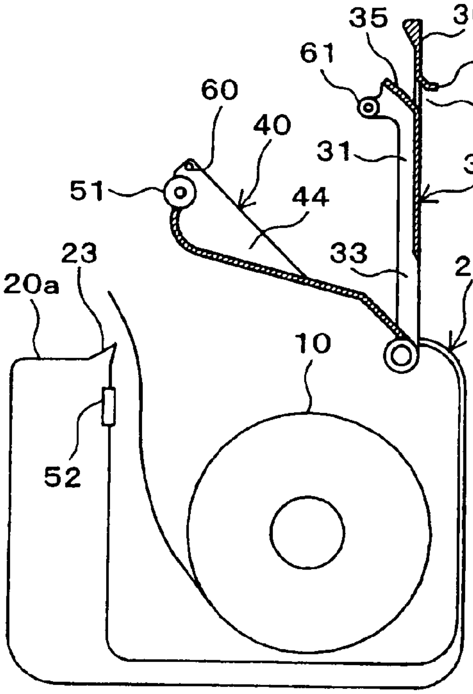
FIG. 8 It is a section view of a label printer according to the embodiment of the invention, showing a label sheet setting procedure in the order of FIGS. 8(*a*) to 8(*d*) in a case where a label is not peeled.
Figure 8:
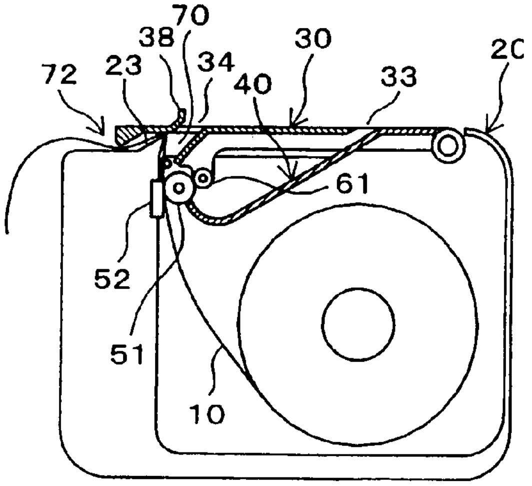
Figure 8:
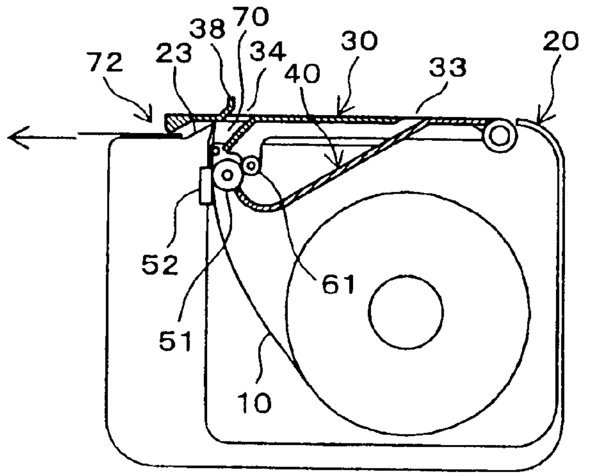
Figure 8:
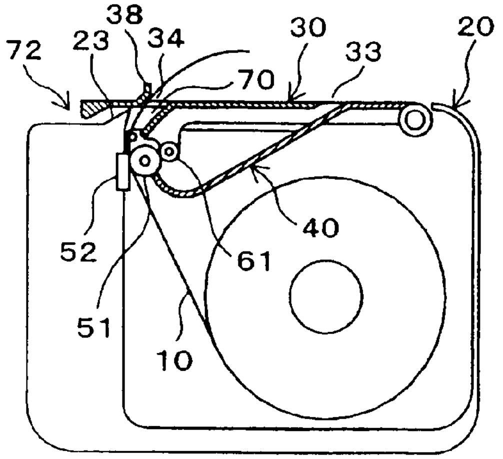

| Description of the Reference Numerals and Signs | |
|---|---|
| 1: Label printer | 10: Label sheet |
| 11: Base sheet | 12: Label |
| 50: Print mechanism | |
| 60: Peel bar (peel mechanism, bent portion) | |
| 62: Peel sensor (label detect means) | |
| 100: CPU (control means) | |

The invention claimed is:

1. A label peeling method for label sheet comprising:

conveying a label sheet including a base sheet and a label affixed to the base sheet along a conveying path that is bent at a bent portion; and performing a printing operation on the label from a beginning portion of printing while conveying the label sheet, wherein the conveying of the label sheet and the printing operation on the label are stopped once a conveying-direction leading end portion of the label, on which the printing is performed, reaches a downstream side of the bent portion of the conveying path and, after a stopping state is held for a predetermined time, the conveying of the label sheet and the printing operation on the label which was stopped, are resumed so that the label, on which the printing is performed by the printing operation, is peeled from the base sheet at the bent portion of the conveying path.

2. A label peeling method for label sheet comprising:

conveying a label sheet including a base sheet and a label affixed to the base sheet along a conveying path that is bent at a bent portion; and performing a printing operation on the label while conveying the label sheet, wherein the label sheet is conveyed until a conveying-direction leading end portion of a next label, on which the printing is performed after the printing on the label is finished, reaches a downstream side of the bent portion of the conveying path, and the label sheet is stopped and stands by until receiving a next printing command, an operation to reversely convey the label sheet to a beginning portion of printing at an upstream side in a conveying path is performed at least once when the next printing command is received, and thereafter, the printing operation on the reversely conveyed label is performed while the label sheet is conveyed so that the label is peeled from the base sheet while conveying the label sheet.

* * * * *

UNITED STATES PATENT AND TRADEMARK OFFICE

CERTIFICATE OF CORRECTION

PATENT NO. : 7,905,976 B2
APPLICATION NO. : 11/577879
DATED : March 15, 2011
INVENTOR(S) : Ogawa It is certified that error appears in the above-identified patent and that said Letters Patent is hereby corrected as shown below:

On the Title Page, column 1, section (87) PCT Pub. No., please delete "WO2006/046546", and insert therefor --WO2006/046456--

In column 6, line 61, please delete "teed", and insert therefor --feed--

In column 8, line 62, after the word "sheet", please insert --10--

In column 10, line 18, after the word "sheet", please insert --10--

Signed and Sealed this
Twenty-sixth Day of July, 2011

David J. Kappos
*Director of the United States Patent and Trademark Office*